Figure 1:
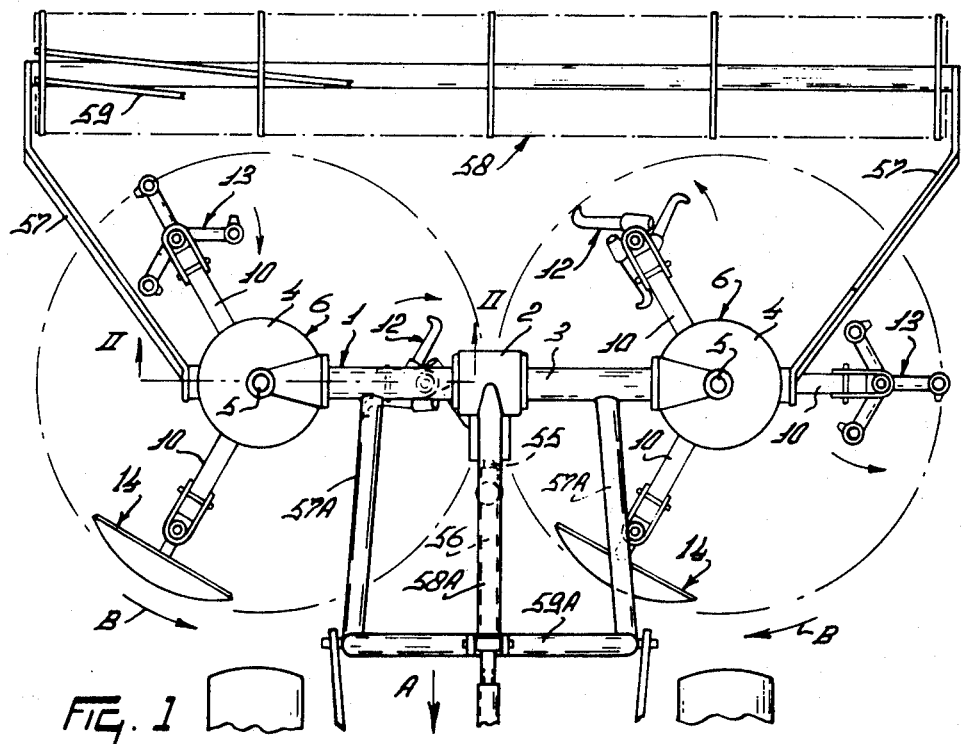

United States Patent [19]
van der Lely

[11] 4,051,903
[45] Oct. 4, 1977

[54] SOIL CULTIVATING MACHINES

[76] Inventor: Cornelis van der Lely, 7, Bruschenrain, Zug, Switzerland

[21] Appl. No.: 620,919

[22] Filed: Oct. 9, 1975

[30] Foreign Application Priority Data

Oct. 10, 1974 Netherlands .......................... 7413312

[51] Int. Cl.² ...................... A01B 33/06; A01B 33/10; A01B 33/12; A01B 33/14
[52] U.S. Cl. ......................................... 172/47; 172/49; 172/51; 172/52; 172/53; 172/59; 172/68; 172/91; 172/100; 172/102; 172/111; 172/713; 172/734; 172/736; 172/748
[58] Field of Search ....................... 172/47, 49, 50-55, 172/59, 68, 91-97, 100, 110, 111, 522-526, 555, 604, 713, 734, 736, 739, 748, 765, 762, 763

[56] References Cited

U.S. PATENT DOCUMENTS

| 75,310 | 3/1868 | Standish | 172/59 X |
|---|---|---|---|
| 1,113,241 | 10/1914 | Niesz | 172/604 X |
| 2,429,298 | 10/1947 | Savage | 172/91 X |
| 2,619,017 | 11/1952 | Stephenson | 172/91 X |
| 3,199,607 | 8/1965 | Granius | 172/111 |
| 3,667,551 | 6/1972 | van der Lely et al. | 172/59 |
| 3,774,689 | 11/1973 | van der Lely et al. | 172/522 X |

FOREIGN PATENT DOCUMENTS

| 69,803 | 11/1892 | Germany | 172/526 |
|---|---|---|---|
| 1,557,789 | 1/1970 | Germany | 172/100 |
| 564,549 | 6/1957 | Italy | 172/111 |
| 492 of | 1907 | United Kingdom | 172/52 |
| 646,318 | 11/1950 | United Kingdom | 172/97 |

Primary Examiner—Paul E. Shapiro
Attorney, Agent, or Firm—Mason, Mason & Albright

[57] ABSTRACT

A cultivating machine has one or more working members that are driven to rotate about upwardly extending axes. Each working member is connected to a drive transmission to turn and, spaced apart soil working members mounted for free rotation about respective axes, are moved through the soil. At least two of the soil working members are different from one another and capable of working the soil in different ways. One member can be a group of tines that are freely rotatable about an upwardly extending axis and an adjacent member can be a disc that rotates about a horizontal axis. Each member includes a stub shaft that is journalled in a universal mount so that the members can be released and exchanged to meet varying soil conditions. The mount has a pivot connection and a setting device to retain the soil working member at various working angles. Also, the stud shaft is adjustable within a sleeve of the mount.

20 Claims, 8 Drawing Figures

U.S. Patent   Oct. 4, 1977   Sheet 1 of 4   4,051,903

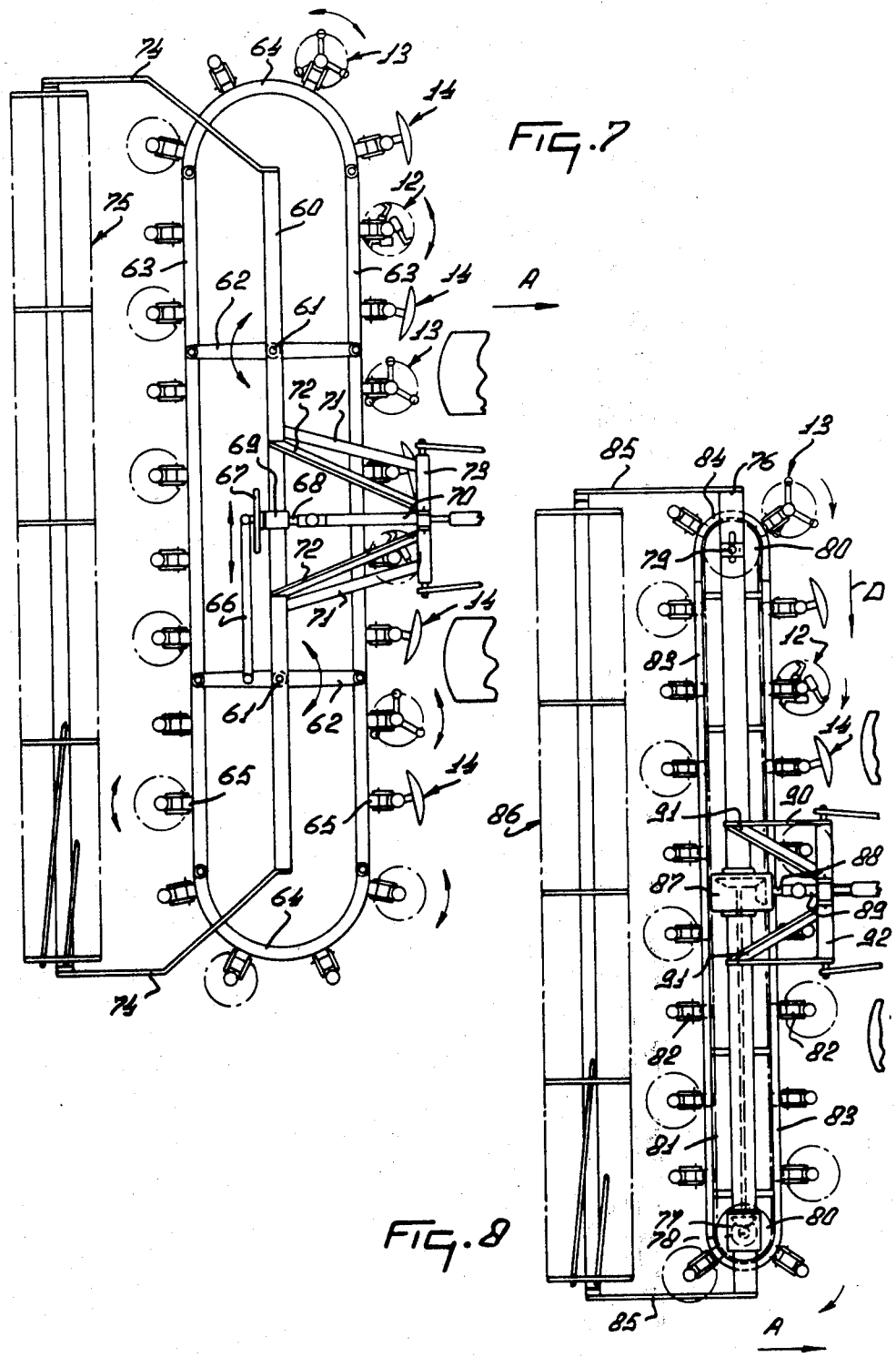

SOIL CULTIVATING MACHINES

Soil cultivating machines are known which have a plurality of soil cultivating means that are of identical structure and identical disposition, all of them engaging the soil to be cultivated in the same manner. Under adverse conditions, for example, on wet and heavy soil, this can bring about the necessity of employing additional machinery for tilling the ground.

According to the present invention there is provided a soil cultivating machine comprising at least one working member arranged to be driven in operation of the machine and to which two or more freely rotatable soil cultivating means are exchangeably secured.

By providing two or more freely rotatable soil cultivating means that are exchangeably secured to the driven working member of the machine, the working member can be adapted to suit various conditions by providing the member with soil cultivating means capable of engaging the soil to be cultivated in different ways, their combined efforts providing such a result that further treatment or the use of further machinery is not required.

Figure 2:
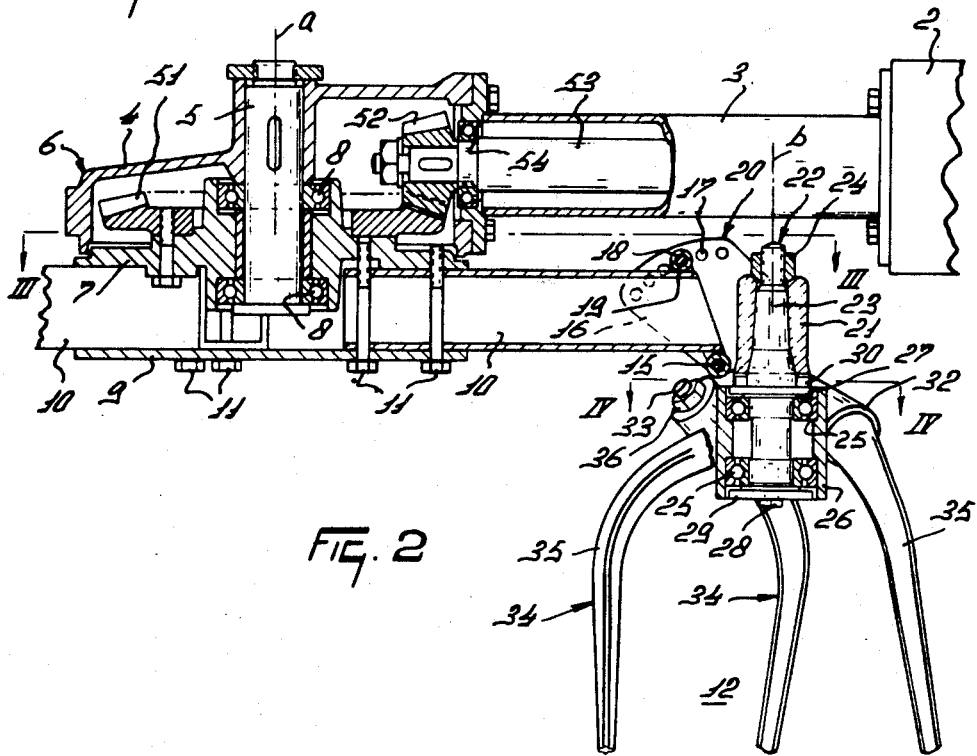
Figure 3:
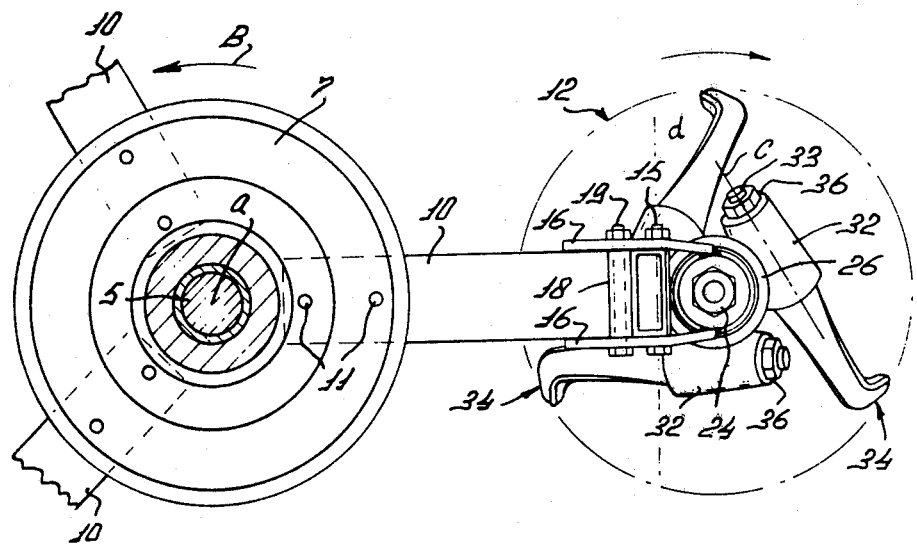
Figure 4:
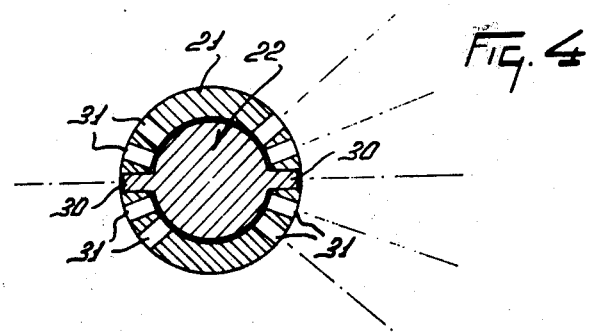
Figure 5:
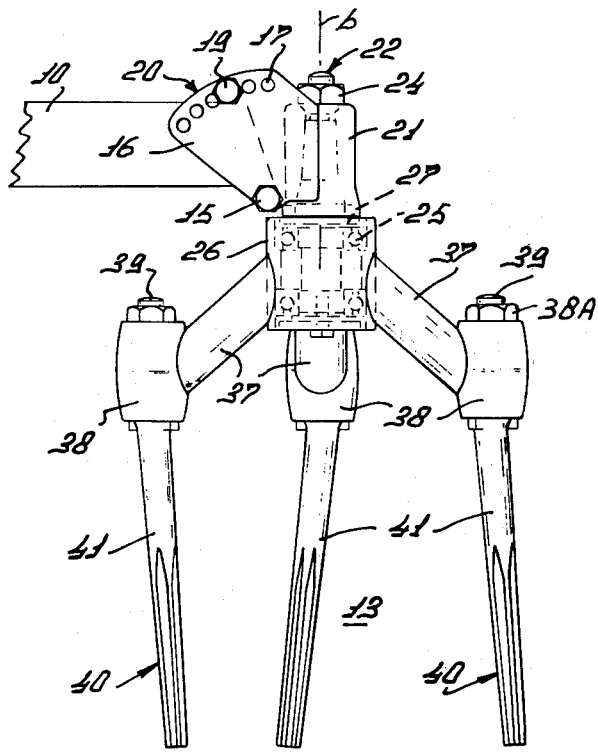
Figure 6:
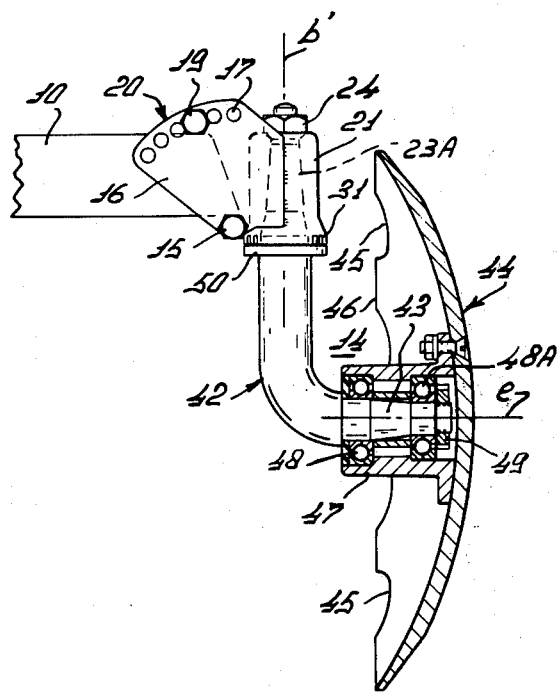

For a better understanding of the invention and to show how the same may be carried into effect, reference will now be made, by way of example, to the accompanying drawings, in which:

FIG. 1 is a plan view of a soil cultivating machine shown hitched to a tractor and in which a working member of the machine is provided with three different soil cultivating means, FIG. 2 is a enlarged sectional view of a detail taken on the line II—II in FIG. 1 and illustrating one of the soil cultivating means, FIG. 3 is a sectional view taken on the line III—III in FIG. 2, FIG. 4 is a sectional view taken on the line IV—IV in FIG. 2, FIG. 5 is a side view illustrating a second of the soil cultivating means, FIG. 6 is a side view, partly in section, illustrating the third of the soil cultivating means, FIG. 7 is a plan view of a second form of soil cultivating machine, and FIG. 8 is a plan view of a third form of soil cultivating machine.

The soil cultivating machine shown in FIGS. 1 to 6 has a frame that includes a frame beam 1, extending transversely of the intended direction of operative travel A of the machine. The frame beam 1 includes tubes 3 on either side of a gear box 2 and joined to this gear box by means of flanges. At their ends remote from the gear box 2 these tubes 3 are fastened by means of flanges to gear boxes 4. Within each of the gear boxes 4 is journalled an upright shaft 5 (FIG. 2). A rotor forming a working member 6 is rotatably arranged about the longitudinal center line a of each shaft 5. Each working member 6 has a central flange 7 which is rotatable about the shaft 5 by means of ball bearings 8 spaced apart in superimposed positions. The flange 7 closes the bottom of each gear box 4. Between the flange 7 and a plate 9 three straight, hollow, radial arms 10 are held by bolts 11 at circumferential angles of about 120° from one another. The arms 10 have a rectangular, preferably square section. At its free end each arm 10 (see FIG. 2) is bevelled so that its bottom edge is more remote from the shaft 5 than its top edge. The free ends of the arms of each working member 6 carry each a differently constructed, readily exchangeable soil cultivating means 12, 13 or 14, to be described more fully hereinafter.

Beneath the bottom edge of the free end of each arm 10 there is a bolt 15 about which on either side of the arm 10 upright plates 16 are rotatable by their lower ends. The plates 16 extend at their upper ends to above the arms 10. Near their top edges the plates 16 have each a row of holes 17 located on an arc of a circle having its centre located on the longitudinal center line of the associated bolt 15. Above the top edge of each arm 10 there is a sleeve 18 through which is passed a bolt 19 which is also passed through any selected one of the holes 17 in each of the plates 16 associated with the arm. Together with the bolts 15 and 19 the plates 16 constitute an adjusting device 20. Beyond the free ends of the arms 10 the plates 16 are slightly bent over towards one another to embrace a sleeve 21 (FIG. 3) that is fast with the plates 16. It is to this sleeve 21 that the particular cultivating means 12, 13 or 14 to be fitted is attached. to this end, and considering first the cultivating means 12, the sleeve 21 receives a stub shaft 22, which projects from the bottom end of the sleeve 21. The portion 23 of the stub shaft 22 that is located inside the sleeve 21 has a lower first conical part extending from the end projecting out of the sleeve to an upper second slightly less steeply tapered second conical part. Above this second conical part there is a screwthreaded end. A nut 24 tapered on its lower face is screwed onto this screwthreaded end and co-operates with a corresponding recess on the top of the sleeve 21 in order to secure the stub shaft 22 in place. A sleeve 26 is freely rotatable by means of spaced ball bearings 25 in superimposed positions about the part of the stub shaft 22 projecting beneath the sleeve 21. The topmost ball bearing 25 is enclosed between a shoulder on the inner face of the sleeve 26 and a ring 27 around the stub shaft 22. The lower ball bearing 25 is enclosed between a shoulder on the inner face of the sleeve 26 and a plate 29 secured by a bolt 28 to the lower end of the stub shaft 22. Just above the ring 27 the stub shaft 22 is provided with diametrically opposite cams 30 which for further fixing the stub shaft 22 are adapted to co-operate with any selected one pair of a group of diametrically opposite recesses 31 in the lower face of the sleeve 21 (FIG. 4). Each group of recesses 31 covers a circumferential angle of about 80°.

In the soil cultivating means 12 the sleeve 26 is provided at equal distances along its circumference with holders 32. Each holder 32 (FIG. 3) has a recess extending in the direction of length thereof and having a longitudinal center line c lying as viewed in plan (FIG. 3) in a plane extending tangentially to a circle centered on the longitudinal center line b of the stub shaft 22, this plane crossing the longitudinal center line b at an acute angle as viewed at right angles (FIG. 2) to the stub shaft 22, the sides of this angle being orientated in downward direction. The recesses of the respective holders 32 receive end portions 33 of times 34. The longitudinal center line of each such end portion 33 coincides with the longitudinal center line c of the recess of its holder 32. The end portion 33 of each time 34 extends from the operative portion 35 of the tine. The operative portion 35 initially extends in line (as viewed in plan) with the end portion 33, passes through a curved part and terminates in a downwardly extending, straight part. The straight part of the operative portion 35 has, away from its upper end, such a shape that this part is at an angle to a plane going through the longitudinal center line of the end portion 33 and parallel to the longitudinal centre line b of the stub shaft 22 (see FIG. 3). The straight part of the operative portion 35 tapers inwardly in downward direction and has an angular cross-section. The lines of connection between opposite corners of this angular cross-section have different lengths and the longer one is tangential to a circle centered on the longitudinal center line b of the stub shaft. Recesses are provided between the corners. Each end portion 33 is held in its holder 32 by means of two conical parts and a nut 36 screwed onto a screwthreaded, free end in a manner similar to the mounting of the stub shafts 22 in the sleeves 21. Each stub shaft 22 with its three tines 34 constitutes a three-tined soil cultivating means 12, which is freely rotatable with respect to its working member 6 about the rotary axis formed by the longitudinal center line b of the stub shaft 22. The tines 34 are constructed and arranged so that their top ends partly formed by the end portions 33, viewed from the side, are orientated in the direction of the rotary axis b of the cultivating means so that, viewed from the side, the cultivating means exhibits approximately the shape of a cone (FIG. 2).

The soil cultivating means 13 shown in detail in FIG. 5 has three arms 37 fastened to its sleeve 26 and having a straight shape extending radially of the stub shaft 22, the arms being at equal circumferential angles to one another. Viewed from the side, the arms 37 are inclined downwards away from their connections to the sleeve 26 and their longitudinal center lines are at an angle of at least 30° to the longitudinal center line b of the stub shaft 22. The free end of each arm 37 is provided with a holder 38 in which an end portion 39 of a tine 40 is fixed by means of a nut 38A. The longitudinal center line of the end portion 39 extends substantially parallel to the longitudinal centre line b of the stub shaft 22. The tine 40 has an operative portion 41 extending from the end portion, the longitudinal center line of the operative portion being at an angle of preferably about 8° to the longitudinal center line of the end portion 39. The operative portion 41 is shaped like the straight part of the operative portion 35 of each tine 34 of the cultivating means 12. The cultivating means 13, like the means 12, is freely rotatable with respect to its working member 6.

Turning to FIG. 6, the cultivating means 14 has a stub shaft 42 with a portion 23A that completely corresponds with the portion 23 described above of the stub shaft 22. Thus the stub shaft 42 can be mounted in the sleeve 21 in the manner already described. The shaft 42 is bent over through 90° near its lower end to form a pin 43, on which a hollow disc 44 is freely rotatable. The hollow disc 44 is provided at its circumference with serrated parts 46 formed by relatively spaced, circular recesses 45, the serrated parts 46 having each a cutting edge. Near the center of the disc 44 a housing 47 on the disc carries spaced ball bearings 48 and 48A mounted on the pin 43 and locked in place by means of a nut 49 at the end of the pin 43. At the lower end of the portion 23A the stub shaft 42 has a shoulder 50 having diametrically opposite recesses 31 in the lower face of the sleeve 21 so that apart from affording an additional fixing of the portion 23A they provide a possibility of setting the pin 43 in a different position relative to the working member 6 after loosening the nut 24 and turning the portion 23A about its longitudinal center line b'. The cultivating means 14 formed by the hollow disc 44, being freely rotatable with respect to its working member 6 about a substantially horizontal axis formed by the longitudinal center line e of the pin 43, can be set in a selected one of a plurality of positions by turning it about an axis coinciding with the longitudinal center line b' of the portion 23A and can be subsequently secured in place with the aid of the nut 24, the cams and the recesses 31.

Each of the cultivating means 12, 13 and 14 described above can be changed over to and fixed in any one of six positions by turning it about the longitudinal center line d of the bolt 15, forming a pivotal axis. The pivotal axis d, about which the cultivating means can turn through an overall angle of about 40° with respect to the rotary axis a of the working member 6, extends tangentially and, as stated above, it crosses this rotary axis a at an angle of at least substantially 90°.

The distance between the rotary axis b' of each cultivating means 12 or 13 and the rotary axis a of its working member 6 is about 40 cms and the cultivating means 12, 13 of adjacent working members 6 work strips of soil about 30 cms wide, which overlap one another.

The pivotal axis d is nearer the axis a about which its working member 6 is adapted to move than the rotary axes b' and e of each cultivating means 14. Apart from being adjusted about the pivotal axis d, the cultivating means 14 can be adjusted, in addition, about the upright axis coinciding with the longitudinal center line b' of the portion 23A. In this manner the position of the disc can be adjusted so that it is more or less inclined to the path described by the pin 43 about which the disc 44 is adapted to rotate. The convex side is invariably orientated to the outside.

For driving the respective working members 6 each flange 7 has a bevel gear wheel 51 located in the gear box 4 and cooperating with a bevel gear wheel 52 on a shaft 53 extending in the direction of length of the frame beam 1 disposed within the tubular parts 3 and in the gear box 2. The shaft 53 is supported in ball bearings 54 in the walls of the gear boxes 4 and 2. Inside the gear box 2 the shaft 53 is drivably connected by means of a bevel gear wheel transmission (not shown) with a shaft 55 projecting from the front of the gear box, extending in the direction of travel A and coupled through an auxiliary shaft 56 with the power take-off shaft of a tractor.

At the ends of the frame beam 1 arms 57 extending rearwardly and inclined downwardly hold a working member 58 extending transversely of the direction of travel A and adapted to rotate about a substantially horizontal axis. The working member 58 includes a plurality of elongated elements 59 located around its periphery and extending in the direction of the rotary axis. Although this is not shown in detail the arms 57 may be pivotally arranged at the ends of the frame beam 1 and there may be provided adjusting mechanism for setting the arms in any selected one of a plurality of positions so that with the aid of the working member 58 the working depth of the soil cultivating means 12, 13 and 14 of the respective working members 6 can be adjusted.

In operation the machine described above is attached to the three-point lift of the tractor by means of a trestle 59 carried on the frame beam 1 with the aid of supports 57A and 58A, and the working members 6 are driven about upright shafts i.e., the longitudinal center lines a of the shafts 5 in opposite directions indicated by the arrows B in FIG. 1 through the driving gear described above. During the rotation of the working members 6 the soil cultivating means 12, 13 and 14 are rotated by the ground contact of the tines or the discs about the rotary axes formed by the longitudinal center lines $b$ of the stub shaft 22 and the longitudinal center line $e$ of the pin 43 so that they rotate in the directions indicated by arcuate arrows for the cultivating means 12 and 13. Since at least three tines are provided in each of the cultivating means 12 and 13, the operative tine portions successively penetrating into the un-worked soil ensure a regular rotation, the respective operative portions of the tines being in dragging or trailing positions relative to the un-worked soil with respect to the direction of rotation. The tapering operative tine portions having an angular cross-section and having recesses in the sides between the corners provide an effective crumbling along the natural fractural lines of the soil, while in addition a uniform distribution of the worked earth is obtained. The tined cultivating means 12 and 13 of different structure are capable of effectively co-operating with the cultivating means 14 formed by the hollow discs 44. The hollow discs 44 can be effectively caused to rotate by the serrations and particularly on heavy soil lumps of earth can be cut out, which can be effectively crumbled up by the tines of the cultivating means 12 and 13 and evenly distributed so that a satisfactory flat seed bed is obtained. By using the different cultivating means the soil to be worked can be engaged in different ways, the effects of the cultivating means 12, 13 and 14 being combined.

Each of the soil cultivating means 12, 13, 14 can be readily removed by loosening the portion 23, 23A respectively of the stub shaft 22 or 42, and can be replaced by one of the other cultivating means. Thus, it is also possible to provide a working member with all the same cultivating means or with only two different cultivating means.

By means of the adjusting device 20 the angle between the rotary axis $a$ of each working member 6 and the rotary axes $b$ or $e$ of the cultivating means carried thereby can be varied. In this way the speed of rotation of the various cultivating means can be adjusted. Moreover, as stated above, the cultivating means 14 formed by the disc 44 can be turned about an axis coinciding with the longitudinal center line $b'$ of the fastening portion 23A of its shaft 42 so that the cutting angle of the disc to the path described by the end of the pin 43 is larger or smaller. The pivotal axis about which each cultivating means 14 is adjustable as a whole is located nearer the rotary axis $a$ of its working member 6 than the rotary axis $e$ of the disc 44. The axes $d$ and $b'$ cross one another at an angle of at least substantially 90° and the pivotal axis $d$ of the device 20 is nearer the rotary axis $a$ of the working member 6 than the pivotal axis $b'$, which extends in upward direction.

FIG. 7 shows a soil cultivating machine in the form of a reciprocating harrow having a frame beam 60 extending transversely of the intended direction of operative travel A of the machine and provided at equal distances from its ends with upright stub shafts 61. Arms 62 extending substantially in the direction of travel A are pivotally arranged around the stub shafts 61 and near the front and rear ends each of these arms is pivotally connected with elongated working members 63 in the form of beams extending transversely of the direction of travel A and substantially parallel to the frame beam 60. The elongated working members 63 are pivoted near their ends by means of stub shafts to outwardly convex bent-over connecting members 64. At equal intervals soil cultivating means 12, 13 and 14 as already described are mounted, on supports 65, on the elongated working members 63 and the connecting members 64. The cultivating means can be readily adjusted and exchanged. In the set-up illustrated in FIG. 7 each disc-shaped cultivating means 14 is located between a pair of tined cultivating means, each such pair consisting of one cultivating means 12 and one cultivating means 13. Consecutive discs are in positions so that along the members 63 one forms the mirror image of the next with respect to a line in the direction of travel A. The relative distances between the cultivating means 12, 13 and 14 on the respective members 63 and on the connecting members 64 are the same, and the distance between a cultivating means on a member 63 and an adjacent cultivating means on a connecting member 64 is also equal to said relative distances.

The right-hand arm 62, viewed from the rear in the direction of travel A, is pivotally connected at a distance behind the stub shaft 61 on the frame beam 60 with one end of an arm 66 whose other end is pivoted to a stub shaft or a crank disc 67 on a shaft 68 extending in the direction of travel A. The shaft 68 is supported in a bearing 69 on the top of the frame beam 60. The front end of the shaft 68, which is located substantially near the centre of the frame beam 60, is connected as illustrated via an auxiliary shaft 70 with the power take-off shaft of a tractor. By means of supports 71 and 72 a trestle 73 is carried on the frame beam 60 for attaching the machine to the three-point lift of the tractor.

At the ends of the frame beam 60 rearwardly extending arms 74 are inclined in downward direction and hold between them a working member 75, adapted to rotate about a substantially horizontal axis and extending transversely of the direction of travel A, the construction of this member being identical to that of the working member 58 already described.

In operation the arms 62 are moved to and fro about the upright shafts 61 via the auxiliary shaft 70 and the crank mechanism 66, 67, and the elongated working members 63, located one behind the other, thus perform reciprocatory movements. During these movements the tines penetrating into the ground cause the respective soil cultivating means 12 and 13 to perform a reciprocatory, rotary movement so that the un-worked soil and the lumps loosened by the reciprocating discs are crumbled by the tines along the natural fractural lines, while substantially no lateral displacement of earth is involved. The strip worked by the cultivating means 12, 13 and 14 is subsequently subjected to a last treatment by the working member 75 rotating about a horizontal axis. As in the first embodiment, the arms 74 supporting the working member 75 may be pivoted to the frame beam 60 and there may be provided an adjusting device for adjusting and fixing the working member 75 in any selected one of a plurality of positions relative to the frame beam 60 so that the working depth of the soil cultivating means 12, 13 and 14 can be adjusted.

In the embodiment shown in FIG. 8 the machine has a hollow frame beam 76 extending transversely of the direction of travel A and holding near one end a gear box 77 in which an upright shaft 78 is journalled which projects out of the bottom of the frame beam 76. Near the other end of the frame beam 76 an upright shaft 79 is journalled and projects likewise out of the bottom of the beam 76. The shaft 79, as is shown schematically, is slidable, and then fixable, over a restricted distance in the direction of length of the frame beam. Each of the shafts 78 and 79 is provided at the lower end projecting from the frame beam 76 with a chain sprocket 80, around which a chain 81 is passed which constitutes an endless supporting member for the adjustable and exchangeable cultivating means 12, 13 and 14, carried in the same manner as in the embodiment of FIG. 7. To this end, the chain 81 is provided with equidistant supports 82 on which the soil cultivating means are carried. From FIG. 8 it will be apparent that the discs are arranged in the same positions relative to the cultivating means 12, 13 as in FIG. 7, save that a mirrorimage disposition is not utilised. Moreover other different dispositions are also possible.

The supports 82 are held by guides 83, 84 arranged on the beam 76.

At the ends of the beam 76, rearwardly extending arms 85 are inclined in downward direction, between the free ends of which arms a working member 86, extending transversely of the direction of travel A, is freely rotatable, the construction and disposition of which is completely the same as that of the working member 75 of FIG. 7. Also in this case the arms 85 may be adjustable in a direction of height.

Inside the gear box 77 the shaft 78 is drivably connected through a bevel gear wheel transmission with one end of a shaft 86, journalled in the beam 76. The shaft 86 is located by its other end in the gear box 87 near the centre of the beam 76. Inside the gear box 87 the shaft 86 is drivably connected through a bevel gear wheel transmission with a shaft 88, which as illustrated is coupled via an auxiliary shaft 89 with the power take-off shaft of a tractor. By means of supports 90 and 91 a trestle 92 is carried on the beam 76 for attaching the machine to the three-point lift of the tractor.

The operation of the machine described above corresponds with that of FIG. 7, but with this machine an endless, elongated working member is provided which is equipped with soil cultivating means 12, 13 and 14, which member is driven via the transmission described above in the direction of the arrow D, whilst the cultivating means in operation rotate about their respective axes $b$ and $e$ as indicated by the arcuate arrows for the cultivating means 12 and 13.

While various features of the soil cultivating machines that have been described, and that are illustrated in the drawings, will be set forth in the following claims as inventive features, it is to be noted that the invention is not necessarily limited to these features and that is encompasses all of the features that have been described both individually and in various combinations.

What we claim is:

1. A soil cultivating machine comprising a frame and at least one soil working member mounted on said frame, said soil working member being rotatable about at least one upwardly extending axis and driving means connected to rotate said soil working member about said axis, at least one soil cultivating means on said soil working member and said cultivating means being freely rotatable on that member, said cultivating means being releasably secured in a mount of said soil working member and turnable about pivot connections, including a first pivotal axis and a second pivotal axis, relative to the soil working member, said cultivating means being adjustable about both pivotal axes and fixable in any one of a plurality of different working positions relative to either said pivotal axes, said first pivotal axis being nearer to said upwardly extending axis than said second pivotal axis and the latter extending in an upward direction.

2. A soil cultivating machine as claimed in claim 1, wherein there are two working members mounted side-by-side and rotatable about corresponding upwardly extending axes.

3. A soil cultivating machine as claimed in claim 1, wherein said working member has an elongated shape and extends substantially transverse to the direction of travel.

4. A soil cultivating machine as claimed in claim 3, wherein there are two elongated working members arranged one behind the other with respect to said direction of travel.

5. A soil cultivating machine as claimed in claim 4, wherein each elongated working member forms part of an endless member that moves about upright axes.

6. A soil cultivating machine as claimed in claim 4 wherein there are two elongated working members the ends of which are interconnected by connecting members and at least three different cultivating means are also rotatably mounted on the connecting members.

7. A soil cultivating machine as claimed in claim 3, wherein said elongated working member has at least three different cultivating members and multiples of three different cultivating members are mounted on said elongated working member.

8. A soil cultivating machine as claimed in claim 7, wherein said cultivating means are arranged with two different cultivating members being adjacent one another and the relative distances between said different cultivating members are about equal.

9. A soil cultivating machine as claimed in claim 1, wherein a further working member is attached to said frame and is positioned to the rear of said first mentioned working member, said further working member extending transverse to the direction of travel and being rotatable about a substantially horizontal axis, a plurality of elongated elements on the periphery of said further working member and said elements extending in the direction of said horizontal axis.

10. A soil cultivating machine as claimed in claim 1, wherein coupling means on said frame is positioned for attaching the machine to a three-point lifting device of a tractor.

11. A soil cultivating machine comprising a frame and at least one soil working member mounted on said frame, said soil working member being rotatable about an upwardly extending axis and driving means connected to rotate said soil working member about said axis, said soil working member being a rotor that supports a plurality of spaced apart soil cultivating means and said cultivating means being releasably secured in a corresponding universal mount of said rotor, said soil cultivating means comprising a first cultivating member and a second, different, cultivating member, the first and second cultivating members being interchangeable with one another and freely rotatably about respective axes of rotation, each cultivating member including a stub shaft that is releasably secured in a corresponding mount, and said stub shaft having a portion that is received and held in a sleeve of said mount, said portion having a tapering form and an upper end with fastening means that fixes the stub shaft portion in said sleeve.

12. A soil cultivating machine as claimed in claim 11, wherein said first cultivating member comprises a plurality of arms and said arms are inclined away from the respective axis of rotation of that member, said arms having downwardly extending tines secured to outer ends thereof.

13. A soil cultivating machine as claimed in claim 11, wherein two working members are mounted side-by-side and each working member is a rotor with a plurality of soil working means freely rotatable thereon, driving means being provided to drive said two rotors to work overlapping strips of soil.

14. A soil cultivating machine as claimed in claim 11, wherein said cultivating members have different and respective operative portions and the axis about which said first soil cultivating member is rotatable is substantially parallel to the axis of rotation of said rotor, said second cultivating member being rotatable about a substantially horizontal axis.

15. A soil cultivating machine as claimed in claim 14, wherein said first cultivating member comprises a group of at least three tines, said tines having top ends that are orientated inwardly towards the respective axis of rotation of said first member, each tine comprising a lower operative portion which has a straight part oriented downwardly.

16. A soil cultivating machine comprising a frame and at least one soil working member mounted on said frame, said soil working member being rotatable about an upwardly extending axis and driving means connected to rotate said soil working member about said axis, at least one soil cultivating means being mounted for free rotation on said soil working member, said cultivating means being releasably secured in mounting means on said working member and said mounting means comprising a first pivotal axis and a second pivotal axis, said cultivating means being adjustable about both pivotal axes and fixable in any one of a plurality of different working positions relative to either picotal axis, said cultivating means being journalled to said mounting means with a stub shaft and the longitudinal center line of at least part of said stub shaft on which said cultivating means is mounted, constituting said second pivotal axis, said cultivating means and said stub being turnable about said longitudinal center line and fixable in different angular positions, about said center line.

17. A soil cultivating machine as claimed in claim 16, wherein said cultivating means can be adjusted through an overall angle of at least 40° about said first pivotal axis.

18. A machine as claimed in claim 16, wherein said mounting means includes a sleeve mount and said stub shaft is supported in said mount, said stub shaft having locking means that co-operates with further locking means on a lower portion of said sleeve mount, the locking means on said stub shaft comprising two diametrically opposite cams, which co-operate with radial diametrically opposite recesses on the lower portion of said sleeve mount, said recesses covering a circumferential angle of about 80°.

19. A soil cultivating machine comprising a frame and at least one soil working member mounted on said frame, said working member being rotatable about an upwardly extending axis and driving means connected to rotate said working member about that axis, at least one soil cultivating means mounted on said working member and said cultivating means being freely rotatable on that member about a second respective axis, said cultivating means being releaseably secured in a mount on said working member and said mount being connected to said working member through a first pivotal axis, said cultivating means being pivotable in said mount and turnable about a second pivotal axis, said cultivating means being adjustable about both pivotable axes and fixable in any one of a plurality of different working positions relative to either of said pivotal axes, said second pivotal axis extending substantially parallel to said upwardly extending axis and crossing said first pivotal axis, said first pivotal axis being located nearer to said upwardly extending axis than said second pivotal axis.

20. A soil cultivating machine as claimed in claim 19, wherein, viewed in the direction of said upwardly extending axis, said first pivotal axis lies in a plane that extends substantially tangentially to a circle centered on the upwardly extending axis.

* * * * *